United States Patent Office 3,540,932
Patented Nov. 17, 1970

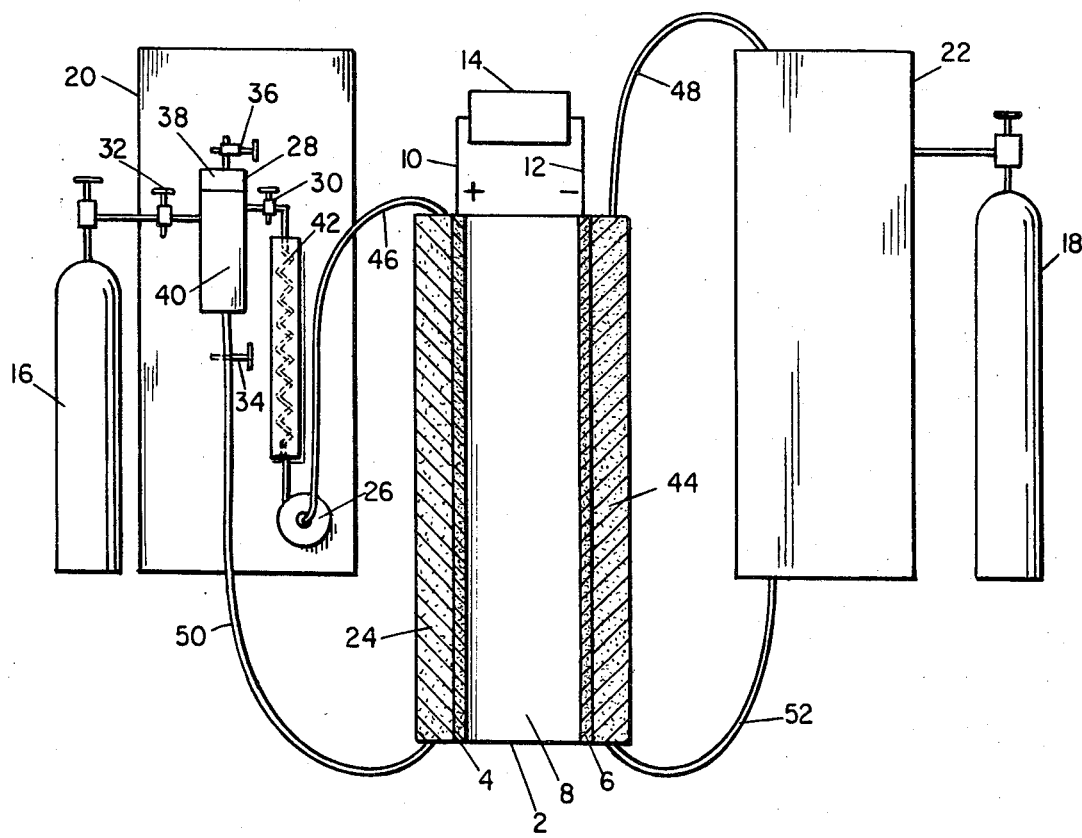

3,540,932
METHOD OF SUPPLYING GAS IN LIQUID ELECTROLYTE TO ELECTROCHEMICAL CELL
Solomon Zaromb, 376 Monroe St.,
Passaic, N.J. 07055
Filed Nov. 9, 1966, Ser. No. 598,582
Int. Cl. H01m 27/00
U.S. Cl. 136—86                                 9 Claims

ABSTRACT OF THE DISCLOSURE

A method of dissolving gaseous reactant in a liquid electrolyte at a pressure of about 100 atmospheres and supplying the gas-liquid mixture to an electrode of an electrochemical cell.

---

This invention relates to novel fuel cell or battery apparatus and methods.

In conventional fuel cells, reactant gases such as hydrogen and oxygen are supplied via dry gas compartments to fuel-cell electrode pores, where they participate in well known electrochemical fuel cell reactions. The power outputs of these fuel cells are limited by the rates at which the reactant gases can penetrate to the active pore sites and also by the rate of heat removal from said active sites.

It is the purpose of my invention to overcome these rate limitations and thereby provide more compact, more efficient, and otherwise superior fuel cells.

It is a further object of my invention to reduce the cost and increase the efficiency of fuel cell electrodes and other battery electrodes which consume gaseous reactants.

My invention consists of supplying the reactant gases via circulating gas-supersaturated carrier liquids in lieu of the dry gases currently used. Supersaturation is accomplished by passing the carrier liquids, e.g., carrier electrolytes, through pressurized gas chambers. The high thermal capacity of the liquid facilitates heat removal from the active electrode areas. Displacement of gas-depeleted electrolyte within electrode pores by fresh gas-rich circulating electrolyte may be facilitated by allowing the gas-supersaturated liquids to form bubbles within electrode pores. Subsequent collapse of these bubbles arising from electrochemical reactant consumption thus yields oscillatory movements within the pores facilitating electrolyte mixing. Said mixing results in an increased rate of supply of reactant gases to active pore sites thereby yielding a higher output current density. The increased rate of gas supply increases the number and area of active pore sites participating in the fuel cell reactions thereby increasing the efficiency and reducing the cost of fuel cell electrodes.

My invention is best explained with the aid of the drawing, the figure, which is a schematic representation of one possible embodiment of my novel fuel cell system.

In the figure is shown a fuel cell 2 comprising porous cathode 4 and porous anode 6 separated by an electrolyte compartment 8, as in conventional fuel cells. Electrical current from electrodes 4 and 6 is carried via electrical leads 10, 12 to a load 14. Reactant gases are supplied to electrodes 4 and 6 from pressurized gas tanks 16, 18 via carrier electrolytes circulating through the flow circuits 20, 22, respectively.

Flow circuits 20 and 22 comprise essentially similar elements, which are shown here in detail only for circuit 20. The gas-carrier electrolyte may be of similar composition as the usual fuel-cell electrolyte in compartment 8, e.g., an aqueous solution of around 40% potassium hydroxide. In circuit 20, gas-poor electrolyte is drawn from cathode gas compartment 24 by a pump 26, which forces said electrolyte into a gas-electrolyte chamber 28 via valve 30. Two other valves 32 and 34 connect chamber 28 to gas supply 16 and to the gas-rich part of circuit 20, respectively. These three valves are electrically actuated by an electrical switching circuit (not shown) which is programmed to open and close these valves in the following sequence:

Step 1: Valves 30 and 34 closed, valve 32 open.
Step 2: Valves 30 and 32 closed, valve 34 open.
Step 3: Valves 32 and 34 closed, valve 30 open.

In addition, an electrically actuated gas-venting valve 36 is caused to open and close in conjunction with valve 30.

Similarly, pump 26 need be powered only when valves 30 and 36 are open. Valve 36 may comprise a selectively permeable membrane, which may be made of hydrophobic material such as porous polyethylene or porous fluorocarbon resin to permit the venting of excess gas while preventing escape of electrolyte when the valve is open.

In step 1, pressurized gas, such as oxygen compressed to around 100 atmospheres, is injected from supply tank 16 into chamber 28. The increased gas pressure in chamber 28 results in increased dissolution of reactant gas 38 in the carrier electrolyte 40. When the gas pressure is thereafter quickly reduced, the electrolyte still retains most of the gas dissolved at the high pressure, and is therefore gas-supersaturated. Thus, in step 2, most of the pressurized electrolyte is forced out of chamber 28 via open valve 34 into the cathode gas compartment 24, where the gas-supersaturated electrolyte displaces the gas-poor electrolyte from which the reactant gas was depleted by the electrochemical cathode reaction. At the same time, the pressure of residual gas in chamber 28 falls to a value only slightly above atmospheric pressure. In step 3, said residual gas is vented via open valve 36, while gas-poor electrolyte leaving cathode compartment 24 is forced by pump 26 to enter chamber 28 via open valve 30. Since the gas pressure in chamber 28 is only moderate in step 3, the required pumping power is negligible in comparison with the fuel cell power output.

Between cathode compartment 24 and pressurizing chamber 28 the electrolyte may be passed through a heat exchanger 42, which would remove the heat generated by the electrochremical reaction in the cathode compartment.

The anode gas compartment 44 may again have a reactant gas such as hydrogen or a hydrogen-containing mixture or compound supplied thereto from supply tank 18, and/or heat removed therefrom to the surroundings, via electrolyte-circulating system 22 comprising essentially the same basic elements (not shown) as the aforedescribed flow circuit 20. Either or both gas compartments 24 and 44 may consist of readily permeable porous structures forming part of the respective porous electrodes. The gas-supersaturated electrolytes permeating lengthwise through said porous electrodes would thus be forced directly through electrode pores, and would therefore tend to displace the electrochemically depleted gas-poor electrolyte from said pores, as any fluid flowing through a pore would tend to displace the original fluid within said pore through hydrodynamic friction and mixing.

Alternately, the conventional fuel cell configuration can be adapted to the herein disclosed flooded type of fuel cell by having the gas-supersaturated electrolyte circulating through the usual cathode and anode gas compartments. In this case it is still possible to facilitate mixing between the fresh circulating electrolyte and the depleted electrolyte trapped within the pores by optimizing the rate of electrolyte circulation. This optimum rate will depend on the particular fuel cell structure and composition. In a gas-supersaturated electrolyte, bubbles tend to form at a rate determined by the rate of electrolyte flow and by the electrode structure and composition. These factors determine also the size distribution and the average size of the resulting bubbles. Hence, for a given electrode and gas-compartment structure and electrolyte composition, there is an optimum rate of flow for which the formed bubbles are small enough to be readily trapped within electrode pores. As a trapped gas bubble is electrochemically consumed by the fuel cell reaction, the bubble collapses, and fresh electrolyte is sucked into the pore. This results in considerable displacement of depleted stationary electrolyte within the pores by externally circulating gas-rich electrolyte, as the alternate displacements of bubbles by liquid and of liquid by bubbles generate repeated oscillations of the fluids within the pores.

These oscillations and the resulting electrolyte may also facilitate heat removal from the most active electrode sites.

Although conventional fuel cell structure may be adapted to the afore-outlined system, there is obviously no need here to have the electrodes impregnated with hydrophobic substances as in conventional fuel cell electrodes. By dispensing wtih these hydrophobic substances electrode manufacture may be considerably simplified and undesirable obstruction of active electrode pore areas may be avoided. Moreover, a larger over-all pore area becomes active under the above-outlined conditions of higher average reactant gas content within the pore electrolyte.

Although FIG. 1 depicts only one fuel cell utilizing my invention, it is of course obviously feasible to stack a number of such cells in series so as to obtain fuel cell stacks or piles. In order to prevent leakage currents between series-connected cells via the circulating liquid, especially via circulating electrolyte, the latter may be pumped by means of a single varistaltic pump which may act simultaneously on separate flexible inlet and/or outlet tubules 46, 48, 50, 52 connecting the individual electrode compartments to the main circulating systems 20, 22. By squeezing these tubules simultaneously the varistaltic pump breaks the electrical connections through the electrolyte within the tubules besides exerting its normal pumping action. The flexible tubules 46, 48, 50, 52 may also be partly expandible so as to yield a smoothened electrolyte flow in spite of the above-outlined discontinuous pumping and valve-switching steps.

Alternately, it is possible to apply my invention to only one type of electrode, e.g., only to the cathode in a metal-gas battery, such as a zinc-oxygen or aluminum-oxygen battery, wherein an active metal such as zinc or aluminum constitutes the anode. Such a metal-oxgyen battery may again be stacked as discussed above so as to form a battery pile.

There will now be obvious to those skilled in the art many modifications and variations of the above-disclosed embodiments which, however, will not depart from the scope of my invention if outlined by the following claims:

1. A method of supplying a gaseous reactant to an electrode of an electrochemical cell comprising: dissolving said reactant in pressurized form in a liquid carrier electrolyte at a pressure of at least about 100 atmospheres, relieving the pressure from said electrolyte thereby rendering the latter supersaturated with said reactant, and circulating said supersaturated electrolyte past the electrode of said electrochemical cell.

2. A method as claimed in claim 1 wherein said electrochemical cell comprises an electrolyte whose major constituents are of approximately the same composition as said carrier electrolyte.

3. A method as claimed in claim 1 wherein said carrier electrolyte is an aqueous solution of potassium hydroxide.

4. A method as claimed in claim 1 wherein said gaseous reactant contains hydrogen.

5. A method as claimed in claim 1 wherein said reactant contains oxygen.

6. A method as claimed in claim 1 wherein said electrode comprises a readily permeable porous structure.

7. A method as claimed in claim 1 wherein said electrode constitutes a cathode in a gas-metal battery.

8. A method as claimed in claim 1 wherein said circulating carrier electrolyte is gas supersaturated when it comes in contact with said electrode.

9. A method as claimed in claim 1 including passing said circulating carrier electrolyte through a heat exchanger.

References Cited
UNITED STATES PATENTS

| | | | |
|---|---|---|---|
| 2,925,454 | 2/1960 | Justi et al. | 136—86 |
| 2,925,455 | 2/1960 | Eidensohn et al. | 136—86 |
| 3,218,195 | 11/1965 | Corren | 136—86 |
| 3,227,585 | 1/1966 | Langford et al. | 136—86 |
| 3,260,620 | 7/1966 | Gruber | 136—86 |
| 3,300,341 | 1/1967 | Gregory et al. | 136—86 |

ALLEN B. CURTIS, Primary Examiner